United States Patent [19]

Hattori et al.

[11] 4,052,968

[45] Oct. 11, 1977

[54] AIR-TO-FUEL RATIO ADJUSTING SYSTEM FOR AN INTERNAL COMBUSTION ENGINE

[75] Inventors: Tadashi Hattori, Nishio; Shigetaka Takada, Oobu; Fumio Sugi, Okazaki; Takamichi Nakase, Gamagori, all of Japan

[73] Assignee: Nippon Soken, Inc., Nishio, Japan

[21] Appl. No.: 605,175

[22] Filed: Aug. 15, 1975

[30] Foreign Application Priority Data

Aug. 19, 1974 Japan .................................. 49-95355

[51] Int. Cl.$^2$ ...................... F02D 1/04; F02D 35/00; F02D 33/00; F02B 15/00
[52] U.S. Cl. .................. 123/119 EC; 123/32 EE; 123/119 D; 123/124 B
[58] Field of Search ........ 123/119 E, 119 EE, 32 EE, 123/32 EA, 119 D, 124 RB; 60/276

[56] References Cited

U.S. PATENT DOCUMENTS

| | | | |
|---|---|---|---|
| 2,621,911 | 12/1952 | Lindsteadt | 123/119 R |
| 3,738,341 | 6/1973 | Loos | 123/119 E |
| 3,745,768 | 7/1973 | Zechnall et al. | 60/276 |
| 3,861,366 | 1/1975 | Masaki et al. | 123/119 EC |
| 3,974,813 | 8/1976 | Knapp et al. | 123/119 EA |

*Primary Examiner*—Wendell E. Burns
*Attorney, Agent, or Firm*—Cushman, Darby & Cushman

[57] ABSTRACT

A carburetor for applying air-fuel mixture to an internal combustion engine includes a main passage for applying air-fuel mixture and principally controlling the amount thereof.

The air-to-fuel ratio of the air-fuel mixture to be supplied to the engine is detected by an air-to-fuel ratio detector mounted in an exhaust pipe of the engine, and when the detected ratio is lower than a stoichiometrically optimum air-to-fuel ratio for perfect combustion of the air-fuel mixture additional air is supplied to the main passage through a bypass passage, the amount of which is controlled by a bypass valve mounted in the bypass passage.

An intake air pressure detecting device is mounted in an intake pipe of the engine, and when the detected pressure (absolute pressure) in the intake pipe becomes higher additional fuel is supplied to the main passage through an auxiliary fuel jet provided in the carburetor.

10 Claims, 7 Drawing Figures

FIG. 4

| A | C | D | F | G |
|---|---|---|---|---|
| L | L | L | ⊓⊔ | L |
| L | L | H | ⊓⊔ | L |
| L | H | L | ⊓⊔ | L |
| L | H | H | ⊓⊔ | L |
| H | L | L | ⊓⊔ | L |
| H | L | H | ⊓⊔ | L |
| H | H | L | ⊓⊔ | L |
| H | H | H | ⊓⊔ | ⊓⊔ |

FIG. 5

| A | C | D | F | K |
|---|---|---|---|---|
| L | L | L | ⊓⊔ | ⊓⊔ |
| L | L | H | ⊓⊔ | ⊓⊔ |
| L | H | L | ⊓⊔ | ⊓⊔ |
| L | H | H | ⊓⊔ | ⊓⊔ |
| H | L | L | ⊓⊔ | ⊓⊔ |
| H | L | H | ⊓⊔ | ⊓⊔ |
| H | H | L | ⊓⊔ | ⊓⊔ |
| H | H | H | ⊓⊔ | L |

…

AIR-TO-FUEL RATIO ADJUSTING SYSTEM FOR AN INTERNAL COMBUSTION ENGINE

BACKGROUND OF THE INVENTION

1. Field of the Invention

The present invention relates to an air-to-fuel ratio adjusting system for an internal combustion engine which is operable to adjust the air-to-fuel ratio of gas mixture to be fed to an internal combustion engine to an optimum value depending on the operating condition of the engine, by feeding back an air-to-fuel ratio of gas mixture exhausted to an exhaust pipe for accomplishing the purification of the exhaust gas in the internal combustion system.

2. Description of the Prior Art

A carbureter is generally designed and conditioned to be operable to feed gas mixture of an optimum air-to-fuel ratio under any operating condition of the internal combustion engine. However, when atmospheric temperature and/or atmospheric pressure change, the air-to-fuel ratio of the gas mixture varies, which has brought about a problem of resulting in not only the generation of noxious exhaust gases but also the reduction of the purification ability of a catalyst mounted for purifying the exhaust gas as well as the deterioration of the catalyst itself.

Meanwhile, a system has been proposed in which the air-to-fuel ratio of the gas mixture is detected in terms of the oxygen concentration in the exhaust gas and it is fed back to control the air-to-fuel ratio of the gas mixture to an optimum value. However, since an air-to-fuel ratio detector has poor detecting ability when the temperature of the detector itself is low, the detection of the air-to-fuel ratio at a low temperature has been impossible. For example, during the warm-up period of the internal combustion engine following the start-up of the engine, the temperature of the exhaust gas is too low to conduct the heat to the detector and hence the detection of the air-to-fuel ratio is impossible.

SUMMARY OF THE INVENTION

It is an object of the present invention to provide an air-to-fuel ratio adjusting system for an internal combustion engine, in which an operating condition detector for detecting the operating condition of an air-to-fuel ratio detector is provided to determine the operating condition of the internal combustion engine and a carbureter of variable fuel flow path area is provided so that a control circuit can vary a fuel flow path area of the carbureter and an air flow path area of an auxiliary air passage in accordance with the operating condition of the engine, whereby even under a condition which does not permit the detection of the air-to-fuel ratio the noxious exhaust gases can be reduced and further the engine power can be increased.

BRIEF DESCRIPTION OF THE DRAWINGS

FIG. 2b shows a characteristic of an air-to-fuel ratio detector in the system shown in FIG. 2a.

FIG. 3 shows an electrical wiring diagram in the embodiment shown in FIG. 2a.

FIGS. 4 and 5 are truth tables of logical signals which are used to explain the operation of the present invention.

DESCRIPTION OF THE PREFERRED EMBODIMENTS

Figure 1:
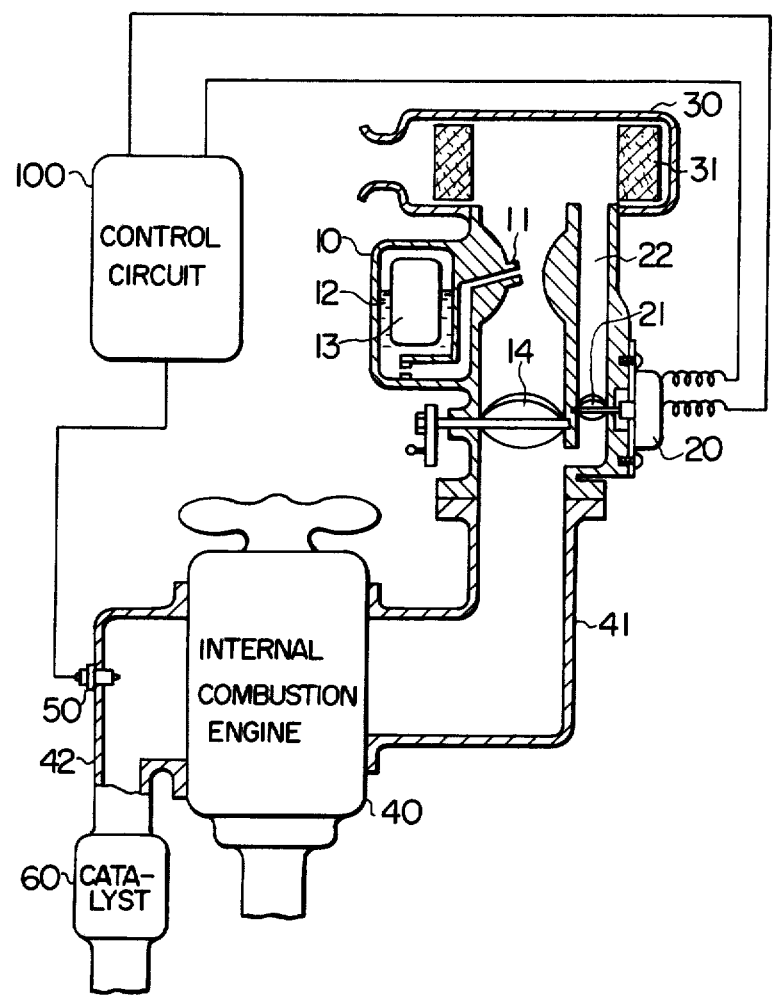
FIG. 1 shows a system configuration illustrating an example of a prior art air-to-fuel ratio adjusting system.

Referring first to FIG. 1, a prior art system is shown in which an auxiliary air flow path 22 which opens to an intake pipe 41, namely to the downstream area of a throttle valve 14 is provided for supplying additional air to the intake pipe, a bypass valve 21 is provided in the flow path 22 for controlling the amount of the additional air and a control circuit 100 responds to an electrical signal from an air-to-fuel ratio detector 50 mounted in an exhaust pipe 42 of an internal combustion engine 40 to control a direction of rotation of a pulse motor 20 and an amount of a rotational angle thereof. With the above arrangement, a carburetor 10 has been previously so adjusted as to feed gas mixture to the internal combustion engine 40, whose air-to-fuel ratio is slightly smaller than a stoichiometrically optimum air-to-fuel ratio for perfect combustion, and the regulation of the air-to-fuel ratio of the gas mixture is accomplished by adding air through the auxiliary air flow path 22 to be the optimum air-to-fuel ratio. More in detail, the air-to-fuel ratio detected by the air-to-fuel ratio detector 50 is fed back to control the air flow path area determined by the rotational angle of the bypass valve 21 resulting in the control of an amount of air added through flow path 22, thus attaining the optimum air-to-fuel ratio. The air-to-fuel ratio detector 50, however, does not work effectively when the temperature of the detector itself is low, and therefore, the detection of the air-to-fuel ratio at such a low temperature is impossible. For example, during the warm-up period of the internal combustion engine following the start-up thereof, the temperature of the exhaust gas is too low to conduct sufficient heat to the detector and hence the detection of the air-to-fuel ratio is not possible.

Thus, during the warm-up period of the internal combustion engine following the start-up thereof, the air-to-fuel ratio detector 50 does not produce an electrical signal, and therefore, the bypass valve 21 is kept completely closed and no air from the auxiliary air flow path 22 is added. As a result, a richer gas mixture from the carbureter 10 is directly supplied to the internal combustion engine 40, which would result in emission of noxious exhaust gases. Further, in this case, since the temperature of a catalyst 60 itself for purifying the exhaust gas is low, sufficient purification is not attained. As a result, a large amount of noxious exhaust gases, particularly carbon monoxide and hydrocarbon, are exhausted into the atmosphere. Further, when the engine is re-started under such a low temperature condition as is not sufficient for the air-to-fuel ratio detector to work effectively after a substantial time passes from the completion of the warm-up of the engine, the bypass valve 21 is still closed and the richer gas mixture from the carbureter 10 is supplied to the internal combustion engine 40, resulting in the exhaust of a large amount of noxious gases and the reduction of the purification ability of the catalyst 60 as well as the deterioration of the catalyst itself.

Accordingly, under the condition where the air-to-fuel ratio detector 50 is not operable, it is necessary to increase the air-to-fuel ratio of the gas mixture to be supplied to the internal combustion engine.

Figure 2A:
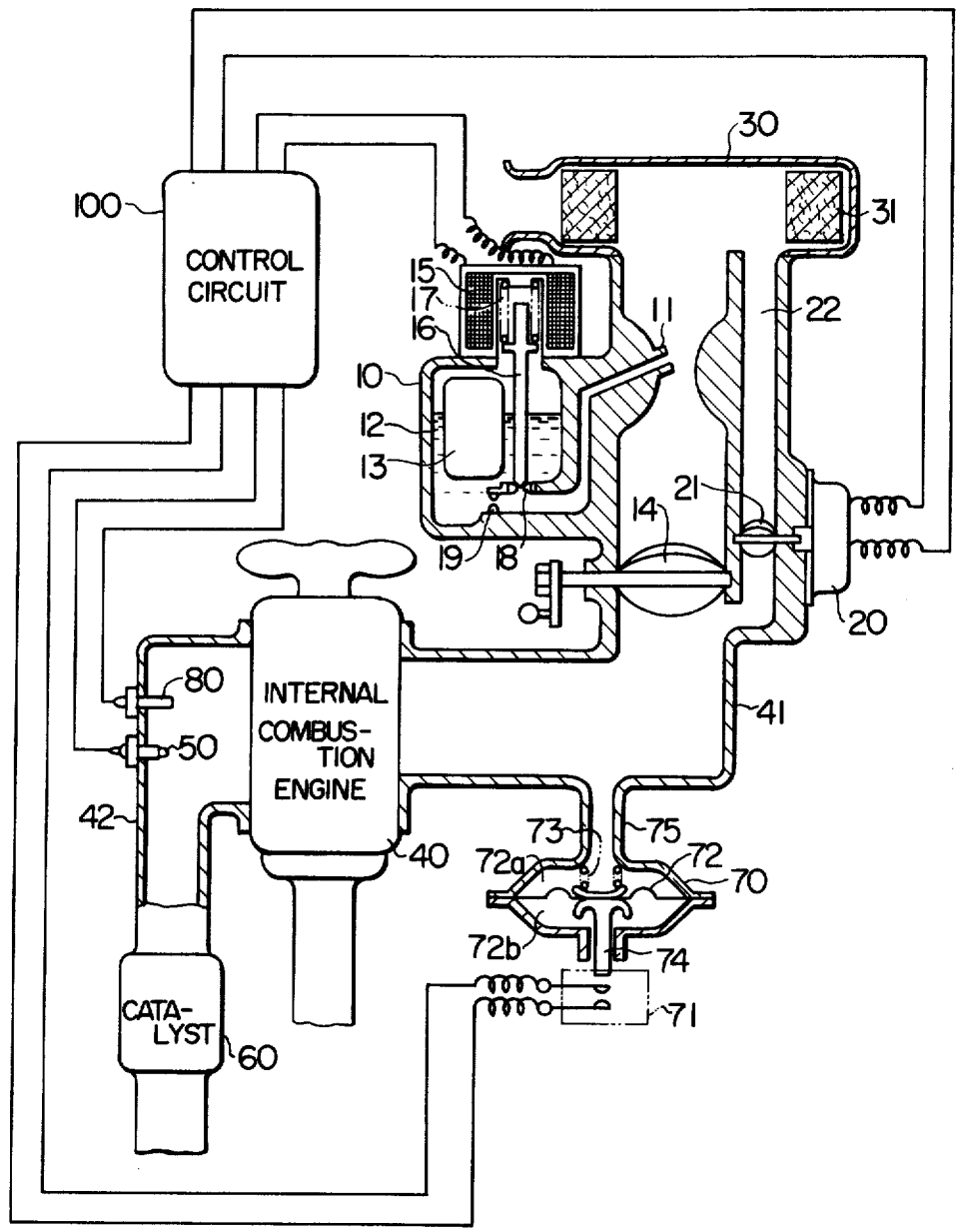
FIG. 2a shows a system configuration illustrating one embodiment of the present invention.
Figure 2B:
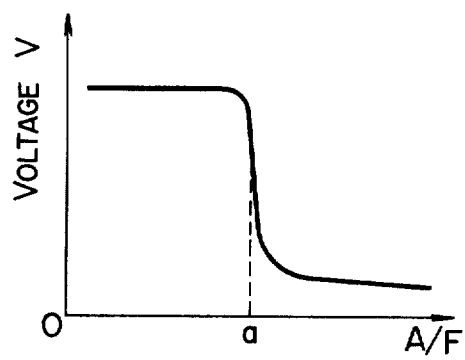
Figure 3:
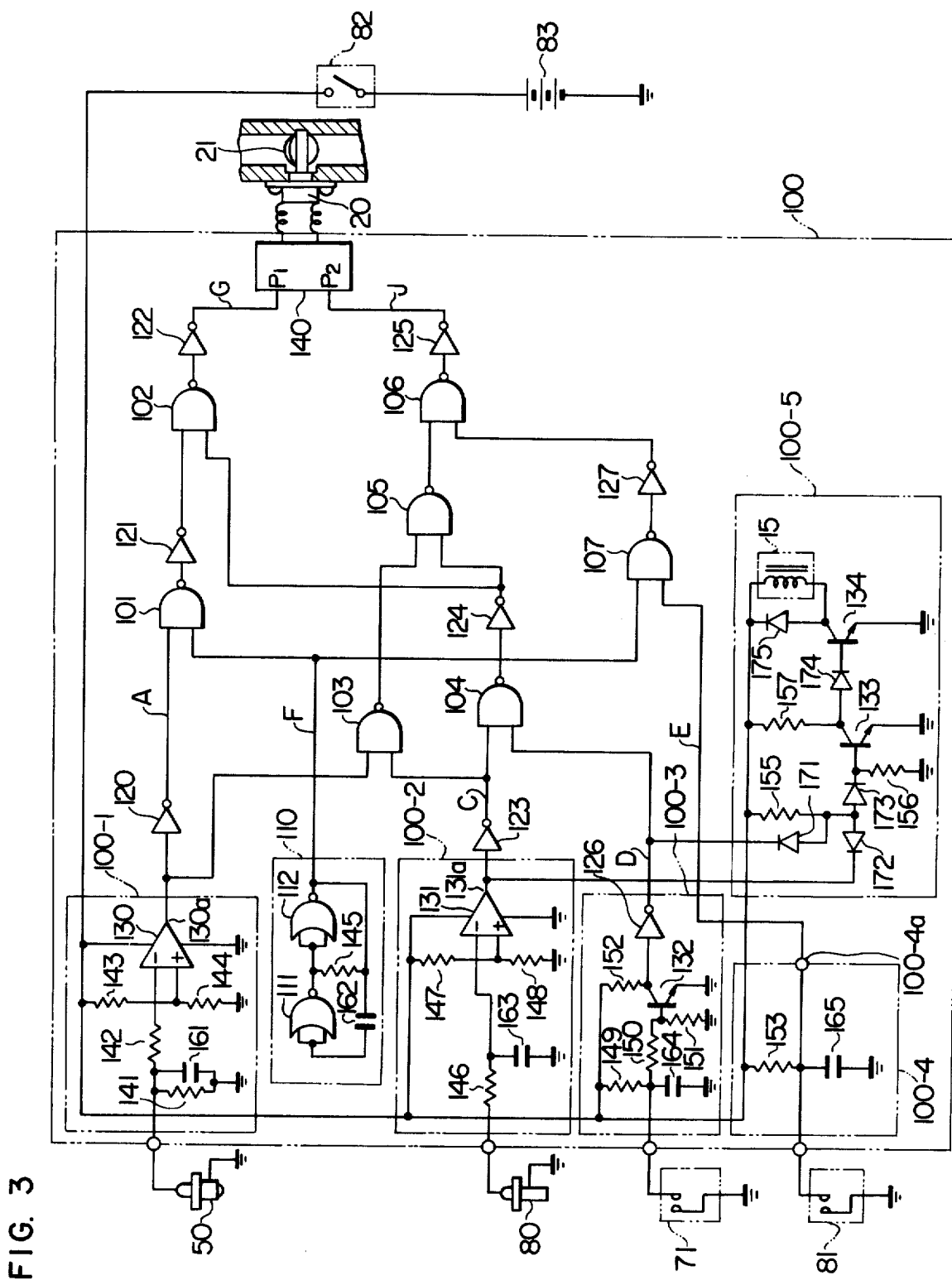

Referring to FIGS. 2a, 2b and 3 showing a first embodiment of the present invention, a carburetor 10 includes a throttle value 14 driven by an acceleration pedal (not shown) for mainly controlling an amount of gas mixture to be supplied to an internal combustion engine 40, a main nozzle 11 interconnected with a main jet 19 and an auxiliary jet 18 for feeding fuel therethrough, a float 13 mounted in a float chamber 12 for controlling an amount of fuel therein and the pressure thereof, a needle valve 16 being normally pressed toward the auxiliary jet 18 to close it, a spring 17 for pressing the needle valve 16 and an exciting coil 15 for pulling the needle valve 16 from the auxiliary jet 18 to open it when excited. The arrangement is adjusted such that when the needle valve 16 closes the auxiliary jet 18 by the urging force of the spring 17 the carburetor 10 supplies gas mixture to the engine, whose air-to-fuel ratio is slightly higher than the optimum air-to-fuel ratio (A/F = 14.8) and when the needle valve 16 is pulled to open the auxiliary jet 18 the fuel flow path area is increased so that the carburetor 10 supplies the gas mixture to the engine, whose air-to-fuel ratio is slightly lower than the optimum air-to-fuel ratio. A bypass valve 21 driven by a reversible pulse motor 20 is mounted in an auxiliary air flow path 22 which communicates with both a downstream area of the throttle valve 14 and an air cleaner 30 including an air-filter element 31 therein. The internal combustion engine 40 is provided with an intake pipe 41 which communicates with the downstream area of the throttle valve 14 and guides the gas mixture into the internal combustion engine 40, and an exhaust pipe 42 for guiding the exhaust gas to a catalyst 60. The exhaust pipe 42 is provided with an air-to-fuel ratio detector 50 and an operating condition detector 80. The air-to-fuel ratio detector 50 comprises a metal oxide of $ZrO_2$ and is designed to produce higher voltage as the air-to-fuel ratio decreases (that is, the oxygen density in the exhaust gas decreases). As shown in FIG. 2b, the characteristic curve of the detector 50 shows a stepwise change in an output voltage near the optimum air-to-fuel ratio (shown at a). The operating condition detector 80 includes a thermocouple and is designed to produce a higher voltage as the temperature of the exhaust pipe 42 (which is substantially equal to the temperature of the air-to-fuel ratio detector 80 itself) becomes higher. An intake air pressure detector 70 is mounted on the intake pipe 41 and comprises a normally open switch 71, a diaphragm 72 for forming an intake-air-pressure compartment 72a communicating with the intake pipe 41 through a conduit 75 and an ambient-pressure compartment 72b communicating with the atmosphere, a spring 73 disposed in the compartment 72a for biasing the diaphragm 72 to the ambient-pressure compartment 72b, and a plunger 74 fixed to the diaphragm 72 for making the normally open switch 71 closed when pushed downwardly in FIG. 2a by the biasing force of the spring 73. It is designed such that when the opening angle of the throttle valve 14 is increased to increase the engine output power, the pressure (absolute pressure) in the intake pipe 41 increases so that the plunger 74 tends to close the switch 71 by the biasing force of the spring 73. A control circuit 100 responds to electrical signals from the air-to-fuel ratio detector 50, the operating condition detector 80 and the intake air pressure detector 70 for determining the operating condition of the engine to produce electrical signals for driving the exciting coil 15 and the pulse motor 20.

The details of the control circuit 100 is explained with reference to FIG. 3. 100-1 designates an air-to-fuel ratio discriminator circuit which comprises resistors 141 and 142, a capacitor 161, a comparator 130 and dividing resistors 143 and 144 which produce a set voltage to a non-inverting input terminal of the comparator 130, an inverting input terminal thereof being connected to the air-to-fuel ratio detector 50 mounted in the exhaust pipe 42 of the engine 40. The dividing resistors 143 and 144 are connected to a battery 83 mounted in a motor vehicle through a key switch 82.

The set voltage determined by the dividing resistors 143 and 144 is preset to a value which is slightly smaller than the output voltage produced by the detector 50 at the substantially optimum air-to-fuel ratio. Therefore, when the air-to-fuel ratio detected by the detector 50 is smaller than the optimum air-to-fuel ratio, that is, when the gas mixture is richer, the comparator 130 produces an "L" level (low voltage level) signal at its output terminal 130a, and when the air-to-fuel ratio detected by the detector 50 is larger than the optimum air-to-fuel ratio, that is, the gas mixture is leaner, the comparator 130 produces an "H" level (high voltage level) signal at the output terminal 130a.

100-2 designates an operating condition discriminator circuit which comprises a resistor 146, a capacitor 163, a comparator 131, and dividing resistors 147 and 148 which produce a set voltage to a non-inverting input terminal of the comparator 131, an inverting input terminal thereof being connected to the operating condition detector 80 mounted in the exhaust pipe 42 of the engine 40 in the same manner as the air-to-fuel ratio detector 50. The dividing resistors 147 and 148 are connected to the battery 83. As stated above, the operating condition detector 80 produces higher output voltage as the temperature becomes higher. The set voltage determined by the dividing resistors 147 and 148 is preset to a value corresponding to a temperature which enables the proper operation of the air-to-fuel ratio detector 50 (about 400° C). Thus, when the temperature of the exhaust pipe 42 detected by the detector 80 is higher than the set temperature defined by the set voltage, the comparator 131 produces an "L" level signal at its output terminal 131a, and when the temperature of the exhaust pipe 42 detected by the detector 80 is lower than the set temperature, the comparator 131 produces an "H" level signal.

100-3 designates an intake air pressure discriminator circuit which comprises resistors 149, 150, 151 and 152, a capacitor 164, a transistor 132 and an inverter 126. A base of the transistor 132 is connected through the resistor 150 to the switch 71 of the intake air pressure detector 70, and a collector of the transistor 132 is connected to the inverter 126.

Under an operating condition of the engine where the intake negative pressure in the intake pipe 41 is higher, that is, the opening angle of the throttle valve 14 is small and the absolute pressure in the intake pipe 41 is lower, the switch 71 is opened and the transistor 132 is in its conducting state so that the input of the inverter 126 is at "L" level resulting in a generation of an "H" level signal at its output. Conversely, when the opening angle of the throttle valve 14 becomes larger to increase the engine output power, the intake negative pressure of the intake pipe 41 is reduced (that is, the absolute pressure is increased) and the diaphragm 72 and the plunger 74 of the intake air pressure detector 70 are moved downwardly (toward the ambient pressure compartment 72b) as viewed in the drawing by the spring 73 to close the switch 71. By the closure of the switch 71, a base current of the transistor 132 is short-circuited to ground through the switch 71 so that the transistor 132 is inverted to its nonconducting state producing an "H" level signal at the input of the inverter 126 while an "L" level signal at the output thereof.

100-4 designates a fully closed position detector circuit which comprises a resistor 153 and a capacitor 165. A junction point of the resistor 153 connected to a power supply or the battery 83 and the grounded capacitor 165 is connected to a fully closed position detection switch 81 which detects a fully closed position of the bypass valve 21 and closes its contact upon detection of the fully closed position thereof. Thus, when the bypass valve 21 is in the fully closed position, the fully closed position detection switch 81 is closed resulting in a generation of an "L" level signal at an output terminal 100-4a while an "H" level signal is produced at the output terminal 100-4a when the bypass valve 21 is at any other position.

110 designates a pulse generator which comprises a resistor 145, a capacitor 162, and NOR gates 111 and 112.

101 designates a NAND gate, one input terminal of which is connected, through an inverter 120 and a line A, to the air-to-fuel ratio discriminator circuit 100-1, and other input terminal of which is connected to the pulse generator 110 so that whenever an "L" level signal exists on the line A the NAND gate 101 produces an "H" level signal at its output, and when an "H" level signal exists on the line A a pulse signal from the pulse generator 110 appearing on a line F is produced in an inverted form at the output of the NAND gate 101. The output of the NAND gate 101 is connected through the inverter 121 to one input terminal of a NAND gate 102, the other input terminal of which is connected through an inverter 124 to an output terminal of a NAND gate 104. One input terminal of the NAND gate 104 is connected through an inverter 123 and a line C to the operating condition discriminator circuit 100-2 while the other input terminal of the NAND gate 104 is connected through a line D to the intake air pressure discriminator circuit 100-3. When the lines C and D are both at "H" level, that is, when the operating condition discriminator circuit 100-2 determines that the exhaust pipe temperature detected by the detector 80 reaches the set temperature and the intake air pressure discriminator circuit 100-3 determines that the intake negative pressure detected by the intake air pressure detector 70 is high and the absolute pressure is low, then the NAND gate 104 produces an "L" level signal at its output, which signal is inverted by the inverter 124 to apply an "H" level signal to the other input terminal of the NAND gate 102. At this time (that is, when an "H" level signal is applied to the other input terminal of the NAND gate 102), if a pulse signal from the pulse generator 110 is arriving at the one input terminal of the NAND gate 102 through the NAND gate 101 and the inverter 121, the pulse signal is applied to a first input terminal $P_1$ of a reversible shift register 140 through the inverter 122 and a line G. The drive of a pulse motor 20 by the reversible shift register 140 may be effected in accordance with a method described in a copending U.S. application Ser. No. 475,917 assigned to the same assignee, Nippon Soken Inc.

103 designates a NAND gate, one input terminal of which is connected to the air-to-fuel ratio discriminator circuit 100-1 and the other input terminal of which is connected to the operating condition discriminator circuit 100-2 through an inverter 123. An output terminal of the NAND gate 103 is connected to one input terminal of a NAND gate 105, the other input terminal of which is connected through the inverter 124 to the NAND gate 104, and an output terminal of the NAND gate 105 is connected to one input terminal of a NAND gate 106.

The other input terminal of the NAND gate 106 is connected to an output terminal of a NAND gate 107 through an inverter 127. One input terminal of the NAND gate 107 is connected to the pulse generator 110 through a line F and the other input terminal thereof is connected to the fully closed position discriminator circuit 100-4 through a line E.

Thus, when an "H" level signal occurs on the line E, that is, when the bypass valve 21 is not at the fully closed position and the fully closed position detection switch 81 is open, the pulse signal from the pulse generator 110 appears in the inverted form at the output of the NAND gate 107, which pulse is further inverted by the inverter 127 before being applied to the other input terminal of the NAND gate 106. At this time, if an "H" level signal from the NAND gate 105 is applied to the one input of the NAND gate 106, the pulse signal is applied through an inverter 125 and a line J to a second input terminal $P_2$ of the reversible shift register 140 to drive the pulse motor 20.

100-5 designates an excitor circuit for an exciting coil 15 mounted in the carbureter 10, which controls the opening and closing of the auxiliary jet 18 by the control of the attraction of the needle valve 16. The excitor circuit 100-5 comprises a control transistor 134 for controlling power supply to the exciting coil 15 from the battery 83, an antiback e.m.f. diode 175 for the exciting coil 15, a pre-stage transistor 133 connected to a base of the control transistor through a diode 174, diodes 171, 172 and 173 for connecting a base of the pre-stage transistor 133 to the output terminal 131a and the line D, and resistors 155, 156 and 157. When an "L" level signal exists at least one of the output terminal 131a and the line D, the pre-stage transistor 133 is non-conducting and the control transistor is rendered conductive. As a result, the exciting coil 15 is powered from the battery 83 and excited.

The operation of the present system described above is now explained.

OPERATION 1

In the cold state operation of the internal combustion engine, the operating condition detector 80 and the operating condition discriminator circuit 100-2 detect that the temperature of the air-to-fuel ratio detector 50 has not reached a temperature which enables appropriate operation thereof, and produce an "H" level signal at the output terminal 131a of the comparator 131. Also, when the intake negative pressure is high, an "H" level signal appears on the line D. Accordingly the exciting coil 15 is not energized and the needle valve 16 is pressed downwardly as viewed in the drawing by the spring 17, whereby the auxiliary jet 18 is in its closed state. Thus, since the amount of fuel flowing out of the main nozzle 11 of the carbureter 10 is metered only by the main jet 19, when the bypass valve 21 is at the fully closed position and no auxiliary air is added, the air-tofuel ratio of the gas mixture supplied to the engine is slightly higher than the optimum air-to-fuel ratio, that is, the gas mixture is slightly leaner. In this cold state operation, since the air-to-fuel ratio detector 50 does not properly operate resulting in a generation of a low level output voltage. Thus, an "L" level signal always exists on the line A and an "H" level signal always exists at the output of the NAND gate 101 so that the pulse signal from the pulse generator 110 is not applied to the first input terminal P₁ of the shift register 140 and the pulse motor 20 does not drive the bypass valve 21 in the direction of opening the valve.

Further, in the cold state operation, when the bypass valve 21 is not at the fully closed position, the fully closed position detection switch 81 is open and an "H" level signal exists on the line E and thereby the pulse signal from the pulse generator 110 is applied to the other input terminal of the NAND gate 106. Because of the cold state operation, the operating condition detector 80 detects that the temperature of the exhaust pipe 2 has not reached the set temperature resulting in a generation of an "L" level signal on the line C, as stated above. Thus, the output of the NAND gate 104 is at "H" level, which is then inverted by the inverter 124 to the "L" level and applied to the other input terminal of the NAND gate 105. Therefore, the NAND gate 105 produces an "H" level signal at its output terminal and thereby the NAND gate 106 applies the pulse signal to the second input terminal P₂ of the reversible shift register 140 to drive the bypass valve 21 in a direction of closing the valve until it is positioned to the fully closed position. When the bypass valve 21 reaches the fully closed position, the switch 81 is closed and an "L" level signal is produced on the line E. Thus, the pulse signal from the pulse generator 110 is now longer applied to the other input terminal of the NAND gate 106, and then a signal which enables further to drive the bypass valve 21 in the direction of closing the valve is not applied to the pulse motor 20 so that the bypass valve 21 is maintained at the fully closed position. At the same time, since the pulse motor 20 is no longer rotated to drive the bypass valve 21 in the direction of closing the valve while the bypass valve 21 is at the fully closed position, damage of the pulse motor 20 by burning can be prevented. In this cold state operation, if the bypass valve 21 is at the fully closed position at the beginning of the operation, the "L" level signal exists on the line E so that the operation of driving the bypass valve 21 in the direction of closing the valve as described above does not occur.

As stated above, in the cold state operation of the internal combustion engine, since the bypass valve 21 is held at the fully closed position, auxiliary air is not added and further since the needle valve 16 closes the auxiliary jet 18, the fuel supply from the main nozzle 11 is metered only by the main jet 19. Thus, gas mixture having a larger air-to-fuel ratio than the optimum air-to-fuel ratio is supplied to the intake pipe 41 of the internal combustion engine 40 resulting in reduction of noxious exhaust gas.

Operation 1a

In the above cold state operation, when the internal combustion engine is driven with a gas mixture of large air-to-fuel ratio, high engine output power is not obtained and sometimes it is not possible to continue the operation of the internal combustion engine. In such a case, by increasing the opening angle of the throttle valve 14, an absolute total amount of fuel supply from the main jet 19 is increased to avoid the unfavorable condition.

Furthermore, the above unfavorable condition can be avoided by making the air-to-fuel ratio of the gas mixture smaller than the optimum air-to-fuel ratio in the following manner.

Owing to the increase of the opening angle of the throttle valve 14, the intake negative pressure in the intake pipe 41 is reduced (namely, the absolute pressure therein is increased), causing the switch 71 of the intake air pressure detector 70 to close, thereby to produce an "L" level signal on the line D. Accordingly, the exciting coil 15 is energized to attract the needle valve 16 upwardly as viewed in the drawing for opening the auxiliary jet 18 to permit the fuel supply from the main nozzle 11 to be conducted not only from the main jet 19 but also from the auxiliary jet 18. In this manner, the air-to-fuel ratio of the gas mixture supplied to the intake pipe 41 is rendered slightly smaller than the optimum air-to-fuel ratio for enhancing the engine output power to allow smooth operation of the internal combustion engine to be continued.

Operation 2

When the air-to-fuel ratio detector reaches a temperature which enables sufficient operation of the detector after the start-up of the engine, the operating condition discriminator circuit 100-2 causes the comparator 131 to produce an "L" level signal at its output terminal 131a to energize the exciting coil 15. Thus, the auxiliary jet 18 opens so that the fuel supply is conducted via the main jet 19 and the auxiliary jet 18 to supply to the intake pipe 41 a gas mixture having a smaller air-to-fuel ratio than the optimum air-to-fuel ratio.

Operation 2a

When the air-to-fuel ratio detector 50 detects that the air-to-fuel ratio of the gas mixture supplied to the engine 40 is smaller than the optimum air-to-fuel ratio, that is, that the gas mixture is richer than the optimum density, the comparator 130 produces an "L" level signal at its output terminal 130a so that the NAND gate 101 applies the pulse signal from the pulse generator 110 to the one input terminal of the NAND gate 102. Since the exhaust pipe temperature is sufficiently high, the operating condition discriminator circuit 100-2 causes the comparator 131 to produce an "L" level signal at its output terminal 131a so that an "H" level signal appears on the line C.

Operation 2a-1

If the engine output power is not increasing, the intake negative pressure in the intake pipe 41 is high and an "H" level signal is produced on the line D, whereby an "L" level signal is produced at the output of the NAND gate 104. Therefore, the "H" level signal is applied to the other input terminal of the NAND gate 102 permitting the NAND gate 102 to apply the pulse signal to the first input terminal P₁ of the shift register 140, whereby the bypass valve 21 is driven in the direction of opening the valve. By the opening of the bypass valve 21, air is added through the flow path 22 so that the air-to-fuel ratio of the gas mixture supplied to the intake pipe 41 is finally controlled to the optimum air-to-fuel ratio.

Operation 2a-2

If the engine output power is increasing, the intake negative pressure of the intake pipe 41 is low and the "L" level signal is produced on the line D. Thus, an "H" level signal is produced at the output of the NAND gate 104, which signal is inverted by the inverter 124 into an "L" level signal, which in turn is applied to the other input terminal of the NAND gate 102 so that the NAND gate 102 does not apply the pulse signal to the first input terminal $P_1$ of the reversible shift register 140, whereby the bypass valve 21 is not driven anymore in the direction of opening the valve. Accordingly, the air-to-fuel ratio of the gas mixture is maintained smaller than the optimum air-to-fuel ratio and thereby the engine output power can be smoothly increased.

Operation 2b

When the air-to-fuel ratio detector 50 detects that the air-to-fuel ratio of the gas mixture supplied to the engine 40 is larger than the optimum air-to-fuel ratio, that is, when the gas mixture is leaner than the optimum density, the comparator 130 produces an "H" level signal at its output 130a. At this stage, owing to an "H" level signal produced on the line C, the NAND gate 103 applies an "L" level signal to the one input terminal of the NAND gate 105 so that an "H" level signal is applied to the one input terminal of the NAND gate 106.

Unless the bypass valve 21 is at the fully closed position, an "H" level signal exists on the line E and thereby the pulse signal from the pulse generator 110 is applied to the other input terminal of the NAND gate 106. Therefore, the pulse signal is supplied through the inverter 125 and the line J to the second input terminal $P_2$ of the reversible shift register 140 to drive the bypass valve 21 in a direction of closing the valve.

By driving the bypass valve 21 in the direction of closing the valve, the amount of air flowing through the flow path 22 is reduced, thus the air-to-fuel ratio of the gas mixture supplied to the intake pipe 41 is finally controlled to the optimum air-to-fuel ratio.

The above operations are summarized below in connection with FIGS. 4 and 5.

Logical expression of the signal appearing on the line G is given by $G = A \cdot C \cdot D \cdot F$, and logical expression of the signal appearing on the line J is given by $J = (\bar{A} \cdot C + \bar{C} + \bar{D}) \cdot E \cdot F = K \cdot E$, where $K = (\bar{A} \cdot C + \bar{C} + \bar{D}) \cdot F$. Truth tables for the logical expressions $G = A \cdot C \cdot D \cdot F$ and $K = (\bar{A} \cdot C + \bar{C} + \bar{D}) \cdot F$ are shown in FIGS. 4 and 5. It is apparent from FIG. 4 that only when "H" level signals exist on all of the lines A, C and D, a pulse signal appears on the line G. Due to the above construction, the pulse motor 20 rotates to drive the bypass valve 21 in the direction of opening the valve.

In other words, the rotational angle of the bypass valve 21 is increased when the air-to-fuel ratio detector 50 has reached a temperature which enables the appropriate operation thereof, the air-to-fuel ratio of the gas mixture supplied to the internal combustion engine is smaller than the optimum air-to-fuel ratio and the intake pipe pressure is not as high as the pressure during the increase of the engine output power.

Conversely, it is seen from FIG. 5 that except when "H" level signals exist on all of the lines A, C and D, a pulse signal appears on the line J if an "H" level signal exists on the line E, and thereby the pulse motor 20 is rotated to drive the bypass valve 21 in the direction of closing the valve.

Namely, when the air-to-fuel ratio detector 50 has not reached sufficient temperature such as during the start-up of the engine, and/or when the air-to-fuel ratio of the gas mixture is larger than the optimum air-to-fuel ratio, and/or when the intake pipe pressure is high during the increase of the engine output power, the rotational angle of the bypass valve 21 is reduced. However, when the bypass valve 21 is in the fully closed position, an "L" level signal is produced on the line E and thereby the bypass valve 21 is not driven any more.

A second embodiment of the present invention will now be described based on the difference from the first embodiment explained above.

Figure 6:
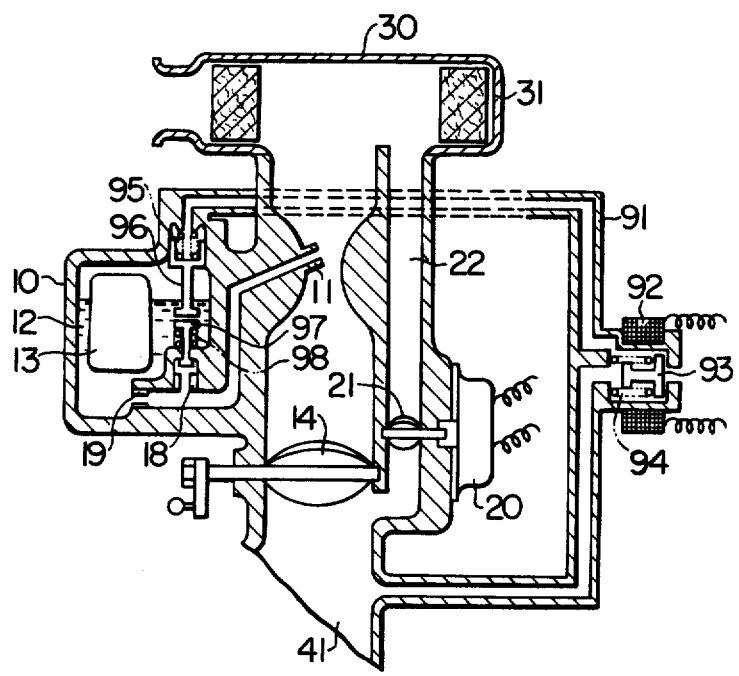
FIG. 6 shows a fragmentary configuration illustrating a second embodiment of the present invention.

Referring to FIG. 6, 91 designates a pressure path connecting the intake pipe 41 with the carburetor 10, 92 designates an exciting coil, 93 a valve, 94, 95 and 98 springs, 96 a power piston and 97 a valve. The arrangement is such that the area of the fuel them path of the carbureter 10 can be changed by switching the pressure introduced into the carbureter 10. Namely, before the exciting coil 92 is energized, the intake pipe pressure is introduced to the carburetor 10 through the pressure path 91 and the valve 97 closes the auxiliary jet 18. On the other hand, when the exciting coil 92 is energized, the valve 93 blocks the intake pipe pressure and an atmospheric pressure is introduced into the carburetor 10. Thus, the power piston 96 presses the valve 97 to open the auxiliary jet 18. By controlling the energization of the exciting coil 92 through the control circuit by the same manner in the first embodiment, the same operation as in the first embodiment is attained.

Although the preferred embodiments of the present invention have been described hereinabove with reference to the drawings, the operating condition detector 80 may comprise a thermocouple, or a temperature switch and can be substituted by means for directly determining the operating condition of the air-to-fuel ratio detector 50 by comparing the voltage produced by the air-to-fuel ratio detector 50 with the set voltage, or substituted by a timer circuit. In order to change the area of the fuel flow path of the carburetor 10, a bi-metal operated valve or wax expansion type valve may be operated to respond to the temperature of the exhaust gas.

We claim:

1. An air-to-fuel ratio adjusting system for an internal combustion engine comprising:
   a carburetor connected to an intake pipe of an internal combustion engine for supplying air-fuel mixture to said engine;
   said carburetor including
   a main passage provided with a throttle valve for controlling the amount of the air-fuel mixture,
   a bypass air passage provided with a bypass valve for compensating the air-to-fuel ratio of the air-fuel mixture by controlling the amount of air flowing therethrough,
   a main fuel jet for supplying fuel through a nozzle opening to said main passage, the amount of said fuel being in proportion to the amount of air flowing through said main passage to produce an air-fuel mixture having an air-to-fuel ratio slightly higher than the stoichiometric one, and
   an auxiliary fuel jet provided with a jet valve means for compensating the amount of fuel supplied through said nozzle to produce an air-fuel mixture having an air-to-fuel ratio slightly lower than the stoichiometric one;

an air-to-fuel ratio detecting means mounted in an exhaust pipe of said engine for detecting the air-to-fuel ratio of the air-fuel mixture supplied to said engine;

a bypass valve control circuit connected to said air-to-fuel ratio detecting means for producing a bypass valve control signal in accordance with the output of said air-to-fuel ratio detecting means;

a driving means coupled to and driving said bypass valve in response to said bypass valve control signal, whereby the amount of air flowing through said bypass air passage is controlled;

an engine condition detecting means for detecting a certain operation condition of said engine;

a jet valve control circuit connected to said engine condition detecting means for producing a jet valve control signal in accordance with the output of said engine condition detecting means; and an actuating means for actuating said jet valve in response to said jet valve control signal, whereby the amount of fuel supplied from said auxiliary fuel jet is controlled.

2. An air-to-fuel ratio adjusting system as set forth in claim 1 further comprising:

means for detecting temperature of said exhaust pipe and stopping the operation of said bypass valve control circuit when the temperature is below a predetermined value.

3. An air-to-fuel ratio adjusting system as set forth in claim 1 further comprising:

means for detecting a position of said bypass valve and stopping the operation of said bypass valve control circuit when said bypass valve is positioned at its fully closed position.

4. An air-to-fuel ratio adjusting system as set forth in claim 1, wherein said engine condition detecting means comprises:

a pressure detecting device mounted in said intake pipe for detecting a negative pressure therein.

5. An air-to-fuel ratio adjusting system as set forth in claim 1, wherein said actuating means comprises:

a plunger normally closing said auxiliary fuel jet; and an electromagnetic coil for actuating said plunger to open said auxiliary fuel jet in response to said jet valve control signal.

6. An air-to-fuel ratio adjusting system as set forth in claim 1, wherein said actuating means comprises:

a first valve normally closing said auxiliary fuel jet;

a second valve including a compartment, a valve body mounted in said compartment and a spring for biasing said valve body to drive said first valve to open;

a conduit for communicating said compartment with said intake pipe;

a third valve mounted in said conduit for normally opening said conduit, thereby to apply the negative pressure in said intake pipe to said compartment; and an electromagnetic coil for actuating said third valve in response to said jet valve control signal to close said conduit, thereby to apply the ambient pressure to said compartment, whereby the first valve opens said auxiliary fuel jet being driven by said valve body.

7. An air-to-fuel ratio adjusting system for an internal combustion engine comprising:

a carburetor, having nozzle means, connected to an intake pipe of an internal combustion engine for supplying fuel through said nozzle means to produce and feed an air-fuel mixture to said engine;

an additional air supply passage communicated with said intake pipe downstream of said carburetor for supplying an additional air through said passage to said intake pipe;

passage area control means operatively disposed in said additional air supply passage for controlling the passage area thereof to control the amount of said additional air flowing therethrough;

air-to-fuel ratio detecting means mounted in an exhaust pipe of said engine for detecting the air-to-fuel ratio of the air-fuel mixture fed to said engine and producing an output signal corresponding to the detected air-to-fuel ratio; and circuit means electrically connected to said air-to-fuel ratio detecting means and said passage area control means for actuating said passage area control means in accordance with said output signal for said air-to-fuel ratio detecting means, the improvement comprising:

main and auxiliary fuel jets disposed in said carburetor and communicated with said nozzle means for supplying the fuel therethrough to said nozzle means;

valve means operatively coupled to said auxiliary fuel jet for opening and closing the same, said main fuel jet being adjusted to produce an air-fuel mixture having an air-to-fuel ratio slightly higher than the stoichiometric one, and said auxiliary fuel jet being adjusted with said main fuel jet to produce an air-fuel mixture having an air-to-fuel ratio slightly lower than the stoichiometric one; and means for actuating said valve means to close said auxiliary fuel jet when both the temperature of said engine and the pressure in said intake pipe are below the respective predetermined values.

8. The improvement as set forth in claim 7, wherein said passage area control means is actuated by said circuit means to move in a direction of increasing the passage area only when all of the following conditions are satisfied, a. the detected air-to-fuel ratio is higher than a predetermined level, b. the temperature of said engine is higher than the predetermined value, and c. the pressure in said intake pipe is higher than the predetermined value.

9. The improvement as set forth in claim 7 further comprising:

means for detecting an opening degree of said passage area control means and stopping the actuation of the same in a direction of decreasing the passage area when said passage area is minimum.

10. The improvement as set forth in claim 9, wherein said passage area control means is actuated by said circuit means to move in the direction of decreasing the passage area when at least one of the following conditions is satisfied, a. the detected air-to-fuel ratio is lower than a predetermined level, b. the temperature of said engine is lower than the predetermined value, and c. the pressure in said intake pipe is lower than the predetermined value.

* * * * *